United States Patent
Dowling et al.

(10) Patent No.: US 7,971,100 B2
(45) Date of Patent: Jun. 28, 2011

(54) FAILURE LOCATION DETECTION USING TYPES IN ASSEMBLY FILES

(75) Inventors: Rafael Goodman Dowling, Kirkland, WA (US); Ryan Randal Elliott, Bothell, WA (US); Israel Hilerio, Kendall, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 12/018,177

(22) Filed: Jan. 22, 2008

(65) Prior Publication Data

US 2009/0187791 A1    Jul. 23, 2009

(51) Int. Cl.
*G06F 11/00* (2006.01)

(52) U.S. Cl. ........................................... 714/38

(58) Field of Classification Search .................. None
See application file for complete search history.

(56) References Cited

U.S. PATENT DOCUMENTS

| | | | |
|---|---|---|---|
| 5,903,728 A | 5/1999 | Semenzato | |
| 6,857,120 B1* | 2/2005 | Arnold et al. | 717/157 |
| 7,162,664 B2 | 1/2007 | Haselden et al. | |
| 7,257,743 B2 | 8/2007 | Glerum et al. | |
| 2005/0210454 A1* | 9/2005 | DeWitt et al. | 717/133 |
| 2005/0240798 A1 | 10/2005 | Benedek et al. | |
| 2006/0005078 A1 | 1/2006 | Guo et al. | |
| 2006/0015852 A1 | 1/2006 | Parkinson et al. | |
| 2006/0075306 A1 | 4/2006 | Chandrasekaran | |
| 2007/0006165 A1 | 1/2007 | Lam et al. | |
| 2007/0168719 A1 | 7/2007 | Masser | |
| 2010/0064179 A1* | 3/2010 | Champlin et al. | 714/38 |

FOREIGN PATENT DOCUMENTS

GB    WO2007113550 A1    10/2007

OTHER PUBLICATIONS

"OSE WLM Failover in the Plugin", IBM Corporation 2000, 2004. p. 2.
"Using the IWMSPlugin Object to Identify Errors", Microsoft Corporation. 2008. p. 2.

* cited by examiner

*Primary Examiner* — Michael C Maskulinski
(74) *Attorney, Agent, or Firm* — Krajec Patent Offices, LLC; Russell S. Krajec

(57) ABSTRACT

A failure identification routine uses a two pass stack trace analysis in conjunction with a list of called types. As each method is called, a call list is generated with the called type, method, and various metadata. During the first pass stack trace analysis, each stack frame is analyzed to determine if the failed type is included in the stack frame. If so, the method associated with the frame is flagged as suspect. If the failed type is not found in the first stack trace, a second pass stack trace analysis is performed and an assembly associated with the method associated with the stack frame is analyzed to determine a set of types. The set of types are analyzed to find at least one match with the called types. If a match exists, the methods associated with the matched types are flagged as suspect.

19 Claims, 5 Drawing Sheets

400
FIRST WALK OF STACK TRACE

FAILURE LOCATION DETECTION USING TYPES IN ASSEMBLY FILES

BACKGROUND

Many computer applications may be made up of computer code that comes from different sources. Sometimes, a dynamic linked library (DLL) or other assembly may be provided by an operating system manufacturer, an application developer, or a third party. Further, various routines may be written by various teams or individuals within an application development team.

When a failure occurs during the execution of the application, determining the location of the failure within the application may be starting point for debugging.

Many applications may be designed to be extensible, where the main application may be extended with adapters that may add capabilities to the application. Some adapters may include additional user interfaces, additional communications services, or other additional capabilities. When a failure is encountered in such an application, a user may not be able to determine if the failure originated with the base application or one of several adapters that may be supplied by different manufacturers.

SUMMARY

A failure identification routine uses a two pass stack trace analysis in conjunction with a list of called types. As each method is called, a call list is generated with the called type, method, and various metadata. During the first pass stack trace analysis, each stack frame is analyzed to determine if the failed type is included in the stack frame. If so, the method associated with the frame is flagged as suspect. If the failed type is not found in the first stack trace, a second pass stack trace analysis is performed and an assembly associated with the method associated with the stack frame is analyzed to determine a set of types. The set of types are analyzed to find at least one match with the called types. If a match exists, the methods associated with the matched types are flagged as suspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
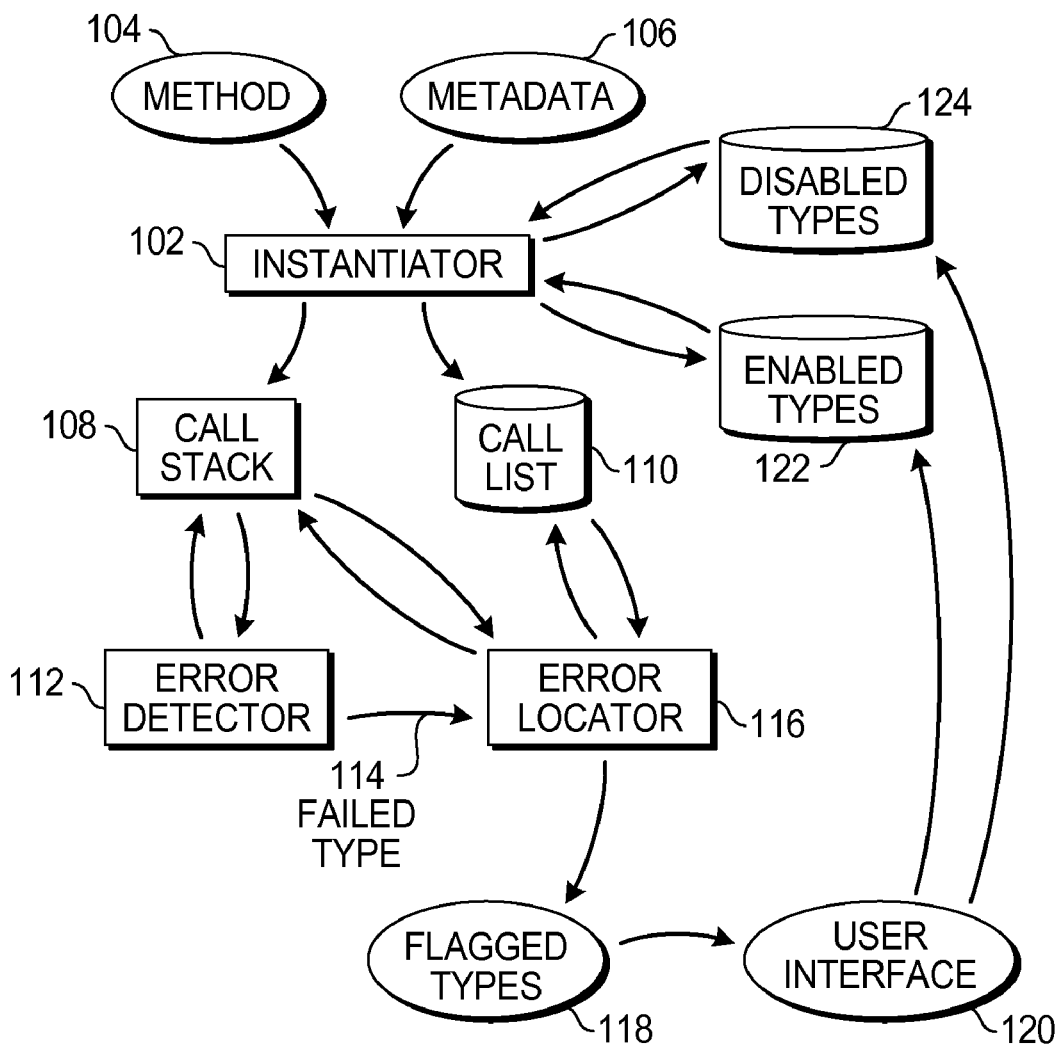
FIG. 1 is a diagram illustration of an embodiment showing a system with an error handling mechanism.

An error handling system uses two passes of a stack trace to flag types that may by suspect due to an error. The first pass compares a failed type with the types defined in each stack frame, while the second pass determines an executable method for a stack frame, examines an assembly associated with the method, and evaluates the types within the assembly to find suspect types.

The error handling system may isolate a portion of executable code that is causing a problem and disable the code. In many cases, metadata about the problem code may be presented to a user. Such metadata may include one or more responsible parties for that portion of failed code.

The error handling system may be useful in extensible applications. Extensible applications may have an interface for adapters, sometimes called plugins, which may add various capabilities to an application. For example, an adapter may add communication or analysis capabilities to an application and add changes to a user interface for the application. A user may be able to extend the base capability of the application by adding adapters for specific desired functionality.

From a distribution standpoint, an extensible application may be kept up to date by distributing updated adapters rather than updates to the entire application. In another use, adapters may be developed by individuals or different companies and separately distributed for the extensible application. In such a use, an application failure may be caused by the extensible application or the adapter, and a user may wish to contact the appropriate responsible party for finding a fix for the failure.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with error handling. Embodiment 100 is an example of a system that may analyze a failure within an executable code to determine what portion of code was responsible for the failure.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 may be used for executing any executable code. In some embodiments, embodiment 100 may be used in embodiments where an application may execute code developed from different sources. An example of such an embodiment is an extensible application environment where an application may have plugins or adapters that may be supplied by different software manufacturers.

An instantiator 102 may take a method 104 and metadata 106 and execute the method in a call stack 108 and also create a call list 110. The method 104 may be any type of executable function or sequence, but is most commonly a computer method within an object oriented programming environment. The call stack 108 may be used within an executable environment for tracking executing methods and calls to other methods.

The metadata 106 may be any type of information that may relate to the method being called. In many cases, the metadata 106 may include an owner or responsible party for the method. The responsible party may be a software manufacturer or distributor and may include a help desk phone number or website address that a user may contact if a problem arises with the code. In cases where the embodiment 100 is used during the development of an application, the responsible party may be a developer or programmer who authored or designed the method 104.

The metadata 106 may be used to store any information about the method 104 that may be helpful if the method 104 were to fail. For an end user, the metadata 106 may include information that may assist the user in obtaining help or include debugging information that may be given to a technician. For a programmer or code developer, the programmer responsible for the method may be used to facilitate communication during debugging.

Some embodiments may include instructions within the metadata 106 that may enable a data collection service to transmit failure and diagnostic data to a remote server. In embodiments where executable code comes from different responsible parties, one of several remote services may be selected using the metadata 106 to receive diagnostic or failure data.

In some embodiments, an instantiator 102 may not permit some methods to operate without having some metadata available. If a method contains a type that is contained in the disabled types 124 database, the method may be disabled. In some situations, a disabled or flagged type may be used to determine that the method 104 should be started in a 'sandbox' mode where the method is operated in a separate application domain from other methods, which may enable increased debugging, tracking, or error handling capabilities.

The call stack 108 may include information relating to the types referred to or created within the method 104. The type information may be used during a second analysis of the call stack 108 to determine the location of an error in the code.

A call stack 108 may grow and shrink during execution. A call stack may grow when one method is called from within another method, and the call stack may shrink as a method successfully completes and control is passed back to the calling method. In some embodiments, the call list 110 may similarly expanded and shrunk so that the call list 110 reflects the metadata and type definitions of the current call stack 108.

The error detector 112 may be a routine that determines that an exception, error, or other abnormal termination of the executing code in the call stack 108 has occurred. Each programming environment may have different mechanisms for determining that an error has occurred and performing an action in response to the error. In many cases, an exception, error, or other abnormal termination may be caught along with some information relating to the abnormal termination. Such information may include a type related to the failure, known as the failed type 114.

The failed type 114 may be captured and transmitted to an error locator 116 that may analyze the call stack 108 and call list 110 to determine flagged type 118 that may be suspect types. The suspect types may be processed automatically or using a user interface 120 to categorize some types as disabled types 124 or enabled types 122.

The error locator 116 may use a two-pass analysis of the call stack 108. In a first pass, a stack trace may be walked comparing the failed type 114 with types associated with methods of each stack frame. If a match is determined, the type is flagged as suspect.

If the failed type 114 is not found in the stack trace, the failed type may exist in a thread that is spawned outside the call stack 108. In order to find the failed type, the call stack may be walked a second time and for each method called, an assembly file may be identified. The types associated with the assembly file may then be compared to the call list 110 to determine if a match exists.

The second walk of the stack trace may compare a larger set of failed types with the call stack 108. The larger set may be taken from an assembly associated with the failed type 114, and each type within the expanded set of failed types may be compared to the call stack 108.

The second walk of the stack trace may be used to find failed types that may have failed in a thread that is spawned outside of the call stack 108. By finding an assembly, such as a dynamic linked library (DLL) or other assembly associated with the failed type, there is a probability that one type in the assembly caused the failed type to execute in a different thread. In some cases, a second walk of the stack may be able to identify specific types within an assembly that may be flagged as suspect. In other cases, all of the types associated with an assembly may be flagged types 118.

When the call stack 108 is walked the first time, a single failed type may typically be identified. When the call stack 108 is walked a second time, two or more failed types may be identified. Such failed types may be flagged types 118. In some cases, the flagged types 118 may be suspect types that may have causes an error.

The flagged types 118 may be used to display an error message in a user interface 120 or present other information to a user. Such an error message may include various portions of metadata associated with the flagged types 118. For example, if a failed type was provided by a specific vendor, the vendor's name, website, help desk, or other information may be provided on the user interface 120.

In some cases, a user may be given various options. For example, a user may be able to disable the flagged types 118 individually or as a group. Such types may be placed in a database for disabled types 124. In some cases, a user may be able to allow the types to be enabled, and such types may be place in a database for enabled types 122.

The user interface 120 may be a graphical user interface. In other embodiments, the user interface 120 may include an email generator that may send a notification email to the user, an administrator, or in some cases to the authors of the flagged types 118. Such emails may include debugging information that may be useful for tracking error occurrences or performance statistics, or for use by software developers when collecting detailed information to track down bugs.

Some embodiments may automatically place flagged types 118 in a database of disabled types 124. In some cases, a user interface 120 may be used to override a default treatment of flagged types 118.

Figure 2:
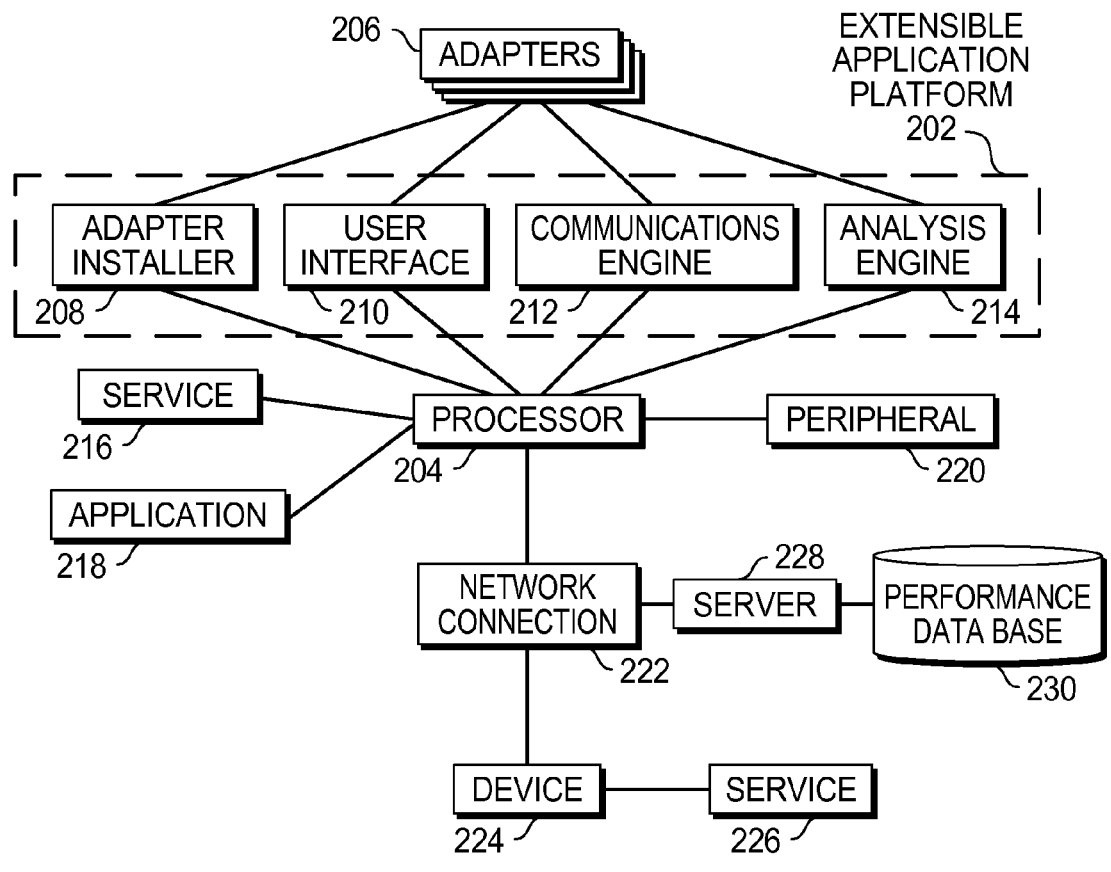
FIG. 2 is a diagram illustration of an embodiment showing a system with an extensible application platform.

FIG. 2 is a diagram illustration of an embodiment 200 showing a user interface for an extensible management console. Embodiment 200 is merely a simplified example of the various components that may be found within a user interface. Each embodiment may have different layout, look and feel, and specific functionality.

The window 202 may be displayed on a computer user interface and may be used by a user to interact with the various services and devices monitored and controlled by an extensible management console.

The window 202 may include several tabs 204, 206, 208, and 210 that may each refer to a separate plugin that may be installed in an extensible management console. As a plugin is installed, a new tab may be created and added to the management console. When a user selects a tab, such as tab 208 that is currently selected, the user may view specific user interface items that relate to the monitored service.

In many embodiments each tab may be presented with an indicator for the monitored service. For example, tab 204 has a 'service' designation. In a typical embodiment, the term 'service' may be replaced with the specific name of a monitored service, such as 'DNS Service'. Similarly, tab 206 has a 'device' designation. In a typical embodiment, the term 'device' may be replaced with 'File Server System' or some other designation.

The user interface for a particular service may include several different items. Commands 212 may be any type of user interface mechanism by which a user may interact with the monitored service or device. In some cases, the commands 212 may be user interface devices such as buttons, drop down lists, text input boxes, or any other user interface device by which a user may select an action. From the user input, a command may be fashioned that may be transmitted to the monitored service or device and executed. In some cases, a user may not recognize that a command may be created and executed by the monitored service or device.

Status indicator 214 and health indicator 216 may be summary information that is gathered from various sources. In some cases, a query may be performed against the monitored service while in other cases, a query may be performed against a status database. In some cases, queries to both the monitored service and status database may be performed.

In many embodiments, a plugin may define status and health indicators for a monitored service using a set of parameters derived from a status database that may include parameters from different services and devices. For example, a status or health indicator for a service or application may include status information from a device on which the service operates or for a service on which the monitored service may depend. Such information may be obtained from a centralized status database that may collect status and performance data from many different services and devices.

The embodiment 200 may include a performance graph 218 that may include specific performance data for the monitored service or device. In some cases, the performance data may be real time or near real time, and in other cases the performance data may be historical data that are collected over time. In some embodiments, a status database may collect and store such historical data.

Figure 3:
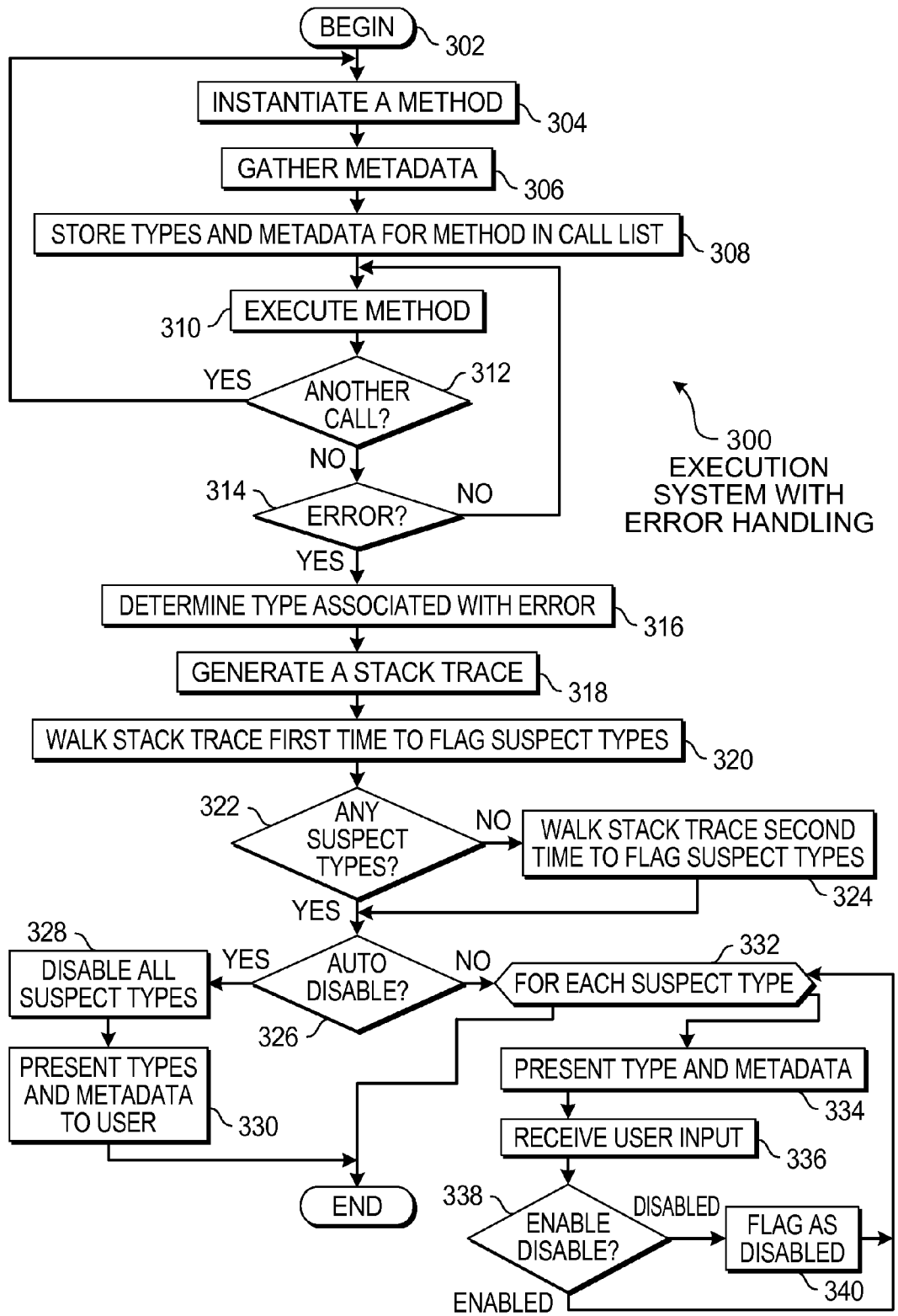
FIG. 3 is a flowchart illustration of an embodiment showing a method for an execution system with an error handling mechanism.

FIG. 3 is a flowchart illustration of an embodiment 300 showing a method for operating an extensible management interface. Embodiment 300 is an example of a method for operating an extensible management interface, and other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

An execution system may begin in block 302. The execution system may be an extensible application that may include plugins or other application parts that may be combined into a customized application.

A method may be instantiated in block 304 and metadata gathered in block 306. The metadata may include any type of data that may be associated with the method, including a responsible party for the method.

The types and metadata associated with the method may be stored in a call list in block 308, and the method may be executed in block 310. If the executing method calls another method in block 312, the process returns to block 304. If an error does not occur in block 314, the process returns to block 310 and execution continues.

When an error occurs in block 314, the type associated with the error may be determined in block 316. Such a type may be a failed type. A stack trace may be generated in block 318 and the stack trace may be walked in block 320 to determine if the failed type is found in the stack trace. If a failed type is found in the stack trace, it may be flagged as a suspect type in block 320. An example of a first pass of the stack trace may be given in embodiment 400 discussed later in this specification.

If no suspect types are determined in block 322, the stack trace may be walked a second time to flag suspect types in block 324. The second pass of the stack trace may use an expanded set of failed types based on the types associated with the assembly of the type that initially failed.

If suspect types are found in block 322, and auto disable is set in block 324, all suspect types may be disabled in block 328. The types and metadata may be presented to a user in block 330. In some embodiments, an email message may be sent to a user or an administrator. Some such embodiments may also collect debugging information that may be emailed to a party responsible for the section of executable code.

If auto disable is not set in block 326, for each suspect type in block 332, the type and metadata may be presented to a user in block 334. Based on the user input in block 336, the type may be enabled or disabled in block 338. If disabled in block 338, the type may be flagged as disabled in block 340.

Figure 4:
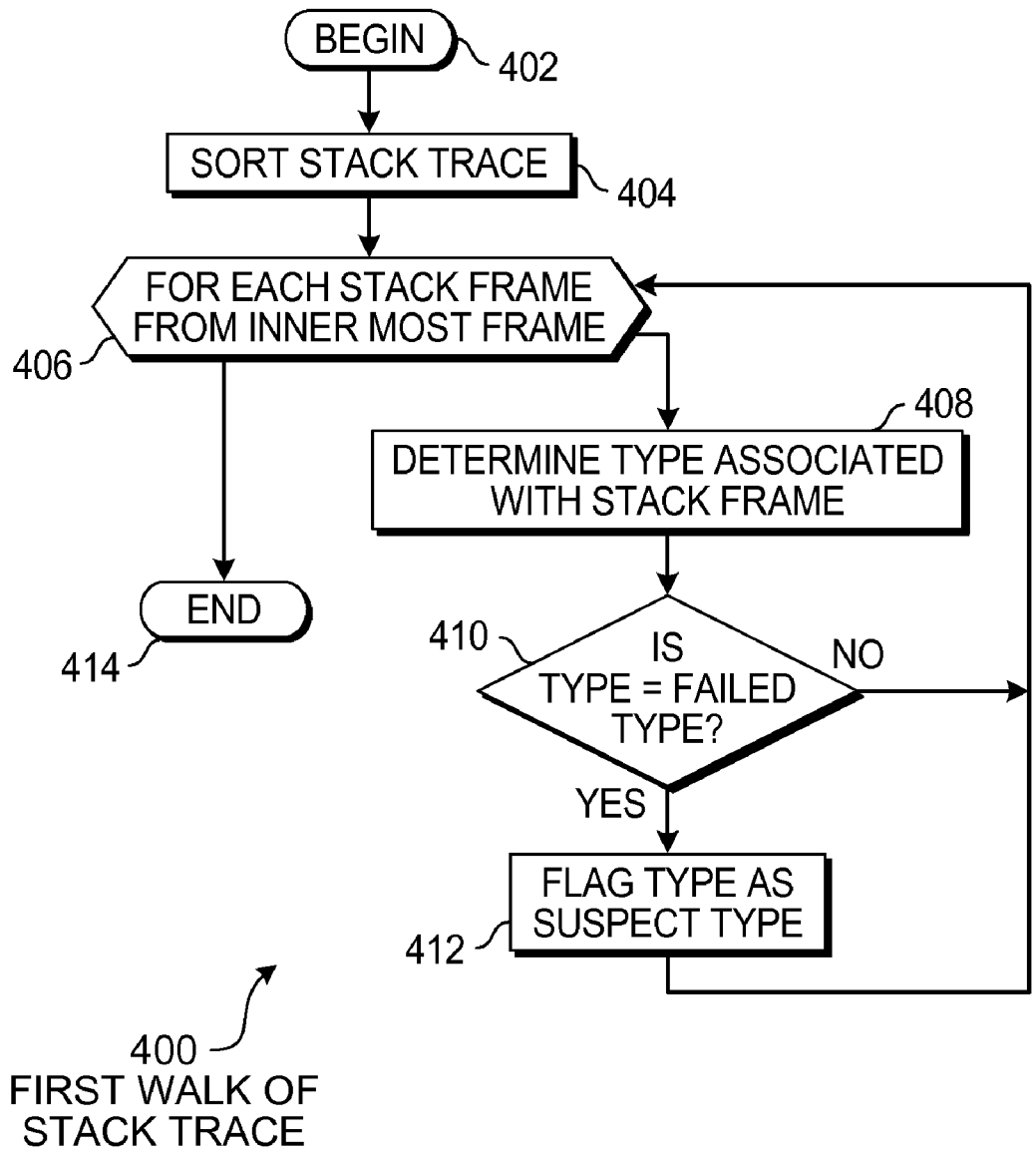
FIG. 4 is a flowchart illustration of an embodiment showing a method for a first stack walk.

FIG. 4 is a flowchart illustration of an embodiment 400 showing a first walk of a stack trace. Embodiment 400 is a simplified version of a stack walk and has been chosen to illustrate various functional concepts. Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The process may begin in block 402.

The stack trace may be sorted in block 404 so that each stack frame may be evaluated from the innermost frame in block 406. A stack frame may have a nested set of stack frames that may be created when one method calls another method.

For each stack frame in block 406, a type associated with the stack frame is determined in block 408. If the type associated with the stack frame is equal to the failed type in block 410, the type may be flagged as a suspect type in block 412. If the failed type is not found in types associated with the stack frame in block 410, the process may revert to block 406 and the next stack frame may be evaluated.

After each stack frame is evaluated in block 406, the process may end in block 414. If the process ends without flagging any types as suspect types, a second pass of the stack trace may be performed.

Figure 5:
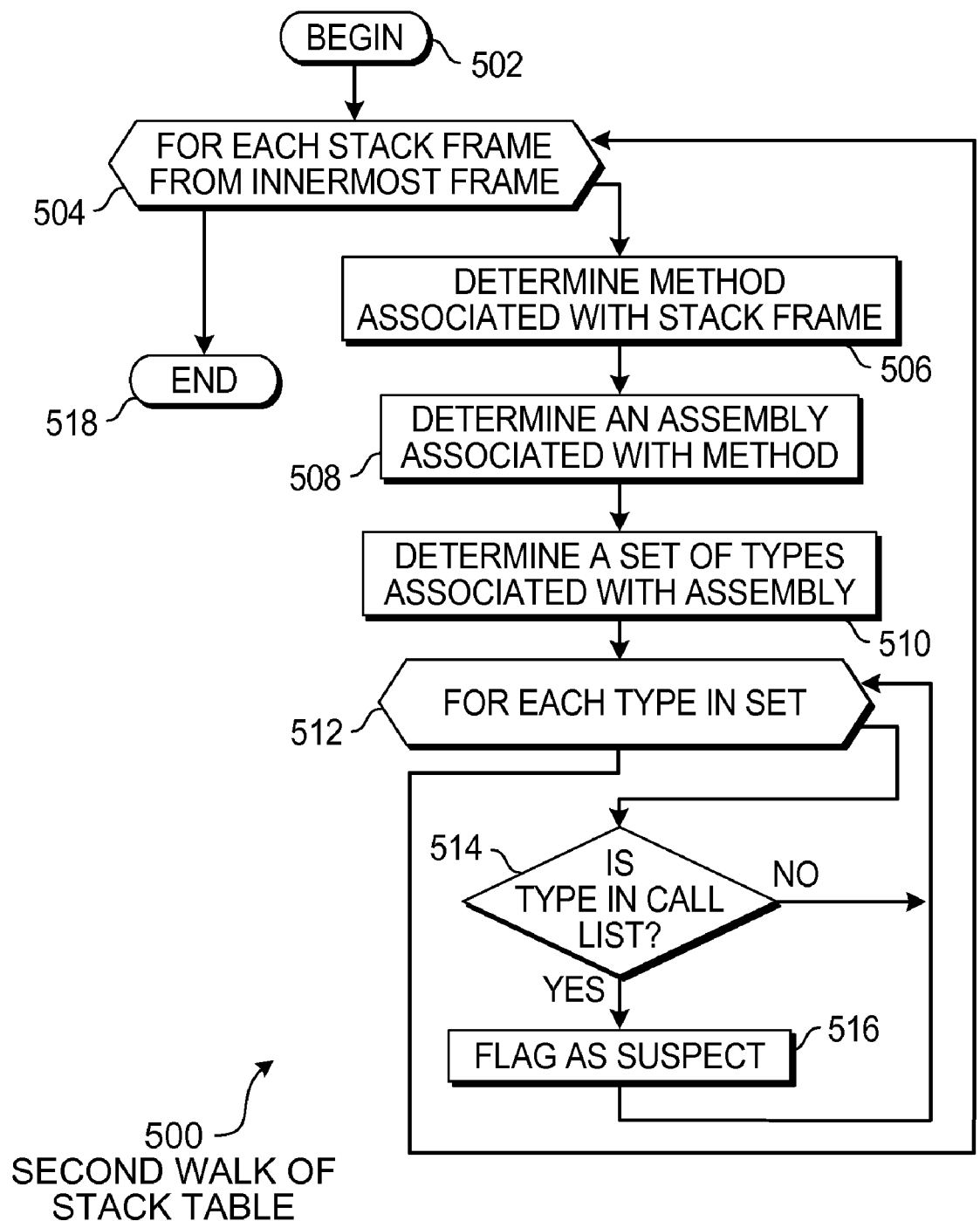
FIG. 5 is a flowchart illustration of an embodiment showing a method for a second stack walk.

FIG. 5 is a flowchart illustration of an embodiment 500 showing a second walk of a stack trace. Embodiment 500 is a simplified version of a second stack walk and has been chosen to illustrate various functional concepts. Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The process may begin in block 502.

For each stack frame, beginning with the innermost frame in block 504, a method associated with the stack frame may be determined in block 506. An assembly associated with the method may be determined in block 508, and based on the method, a set of types associated with the assembly may be determined in block 510.

The set of types may be an expanded set of types that are related to the failed type through a common assembly. In many cases, a single assembly may have the same metadata associated with all the types and methods within the assembly. For example, a single plugin for an application may be made up of one or more assemblies such as DLLs. A failed type within the DLL may indicate a problem with the plugin and troubleshooting or help may be provided by the manufacturer of the plugin, which may be different from the manufacturer of the base application.

After determining a set of associated types in block 512, if the type is in the call list in block 514, the type may be flagged as suspect in block 516. If the type is not in the call list, the next type is evaluated in block 512.

Embodiment 500 performs a stack walk and uses the types associated with the assembly related to each stack frame to determine if one of the types was a failed type.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    instantiating an executable method, said executable method comprising called types;
    storing said called types associated with said executable method in a call list;
    detecting an error;
    determining a failed type associated with said error;
    walking a stack a first time with a method comprising:
        determining a type associated with a stack frame;
        determining if said type is said failed type; and
        if said type is said failed type, flagging said type as a suspect type;
    walking said stack a second time with a method comprising:
        determining a executable method associated with said stack frame;
        determining an assembly associated with said executable method;
        determining a set of types associated with said assembly;
        comparing said set of types to said call list; and
        if at least one of said set of types is within said call list, flagging at least one of said set of types as a suspect type.

2. The method of claim 1 further comprising:
    storing metadata about said executable method in said call list;
    analyzing said call list and for each of said suspect types, retrieving said metadata; and
    displaying at least a portion of said metadata.

3. The method of claim 2, said metadata comprising a responsible party for said executable method.

4. The method of claim 1 further comprising:
for each of said suspect types, disabling said types.

5. The method of claim 1 further comprising:
for each of said suspect types, presenting an option to a user and receiving a user input to enable or disable said suspect type.

6. The method of claim 1, said walking said stack a second time being performed only if no types are flagged as said suspect type.

7. A system comprising:
an instantiator adapted to instantiate an executable method and create a call list comprising types associated with said executable method;
an error detection mechanism adapted to detect that an error has occurred;
an error locator mechanism adapted to:
create a stack trace comprising stack frames;
walk said stack frames in a first pass using a method comprising:
determining a type associated with a stack frame;
determining if said type is said failed type; and
if said type is said failed type, flagging said type as a suspect type;
walk said stack frames in a second pass using a method comprising:
determining a executable method associated with said stack frame;
determining an assembly associated with said executable method;
determining a set of types associated with said assembly;
comparing said set of types to said call list; and
if at least one of said set of types is within said call list, flagging at least one of said set of types as a suspect type.

8. The system of claim 7, said instantiator further adapted to determine metadata relating to said executable method and store said metadata in said call list.

9. The system of claim 8, said metadata comprising a responsible party for said executable method.

10. The system of claim 9 further comprising:
a display adapted to display at least a portion of said metadata.

11. The system of claim 10, said display further adapted to:
present an option to a user; and
based on a user input, enable or disable at least one type.

12. The system of claim 7, said error locator mechanism further adapted to:
disable at least one of said suspect types.

13. The system of claim 7, said walking said stack a second time being performed only if no types are flagged as said suspect type.

14. A system comprising:
a processor;
a computer readable storage device that stores an application framework that operates on said processor adapted to provide a basic user interface;
said computer readable storage device that further stores an adapter interface that operates on said processor, said adapter interface adapted to accept an adapter, said adapter having a user interface definition, said user interface definition being usable by said application framework to create a specific user interface;
said application framework adapted to:
instantiate an executable method, said executable method comprising called types;
store said called types associated with said executable method in a call list;
detect an error;
determine a failed type associated with said error;
walk a stack a first time with a method comprising:
determining a type associated with a stack frame;
determining if said type is said failed type; and
if said type is said failed type, flagging said type as a suspect type;
walk said stack a second time with a method comprising:
determining a executable method associated with said stack frame;
determining an assembly associated with said executable method;
determining a set of types associated with said assembly;
comparing said set of types to said call list; and
if at least one of said set of types is within said call list, flagging at least one of said set of types as a suspect type.

15. The system of claim 14, said application framework further adapted to:
store metadata about said executable method in said call list;
analyze said call list and for each of said suspect types, retrieve said metadata; and
display at least a portion of said metadata.

16. The system of claim 15, said metadata comprising a responsible party for said executable method.

17. The system of claim 14, said application framework further adapted to:
for each of said suspect types, disable said types.

18. The system of claim 14, said application framework further adapted to:
for each of said suspect types, present an option to a user, receive a user input, and based on said user input enable or disable said suspect type.

19. The system of claim 14, said walking said stack a second time being performed only if no types are flagged as said suspect type.

* * * * *